Feb. 9, 1943. C. DORNIER 2,310,765
AIRCRAFT-STRUCTURE
Filed Nov. 4, 1938 3 Sheets-Sheet 3
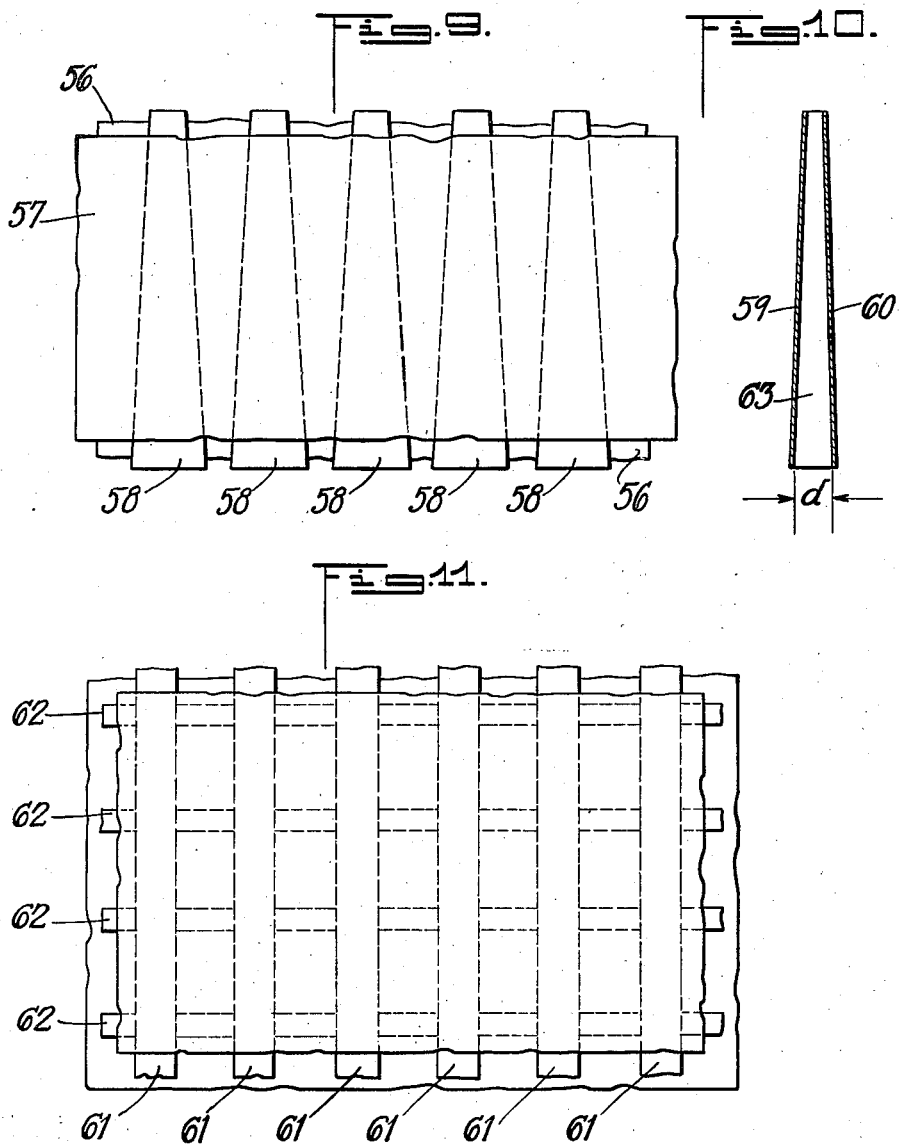
INVENTOR.
CLAUDE DORNIER.
BY
ATTORNEY.

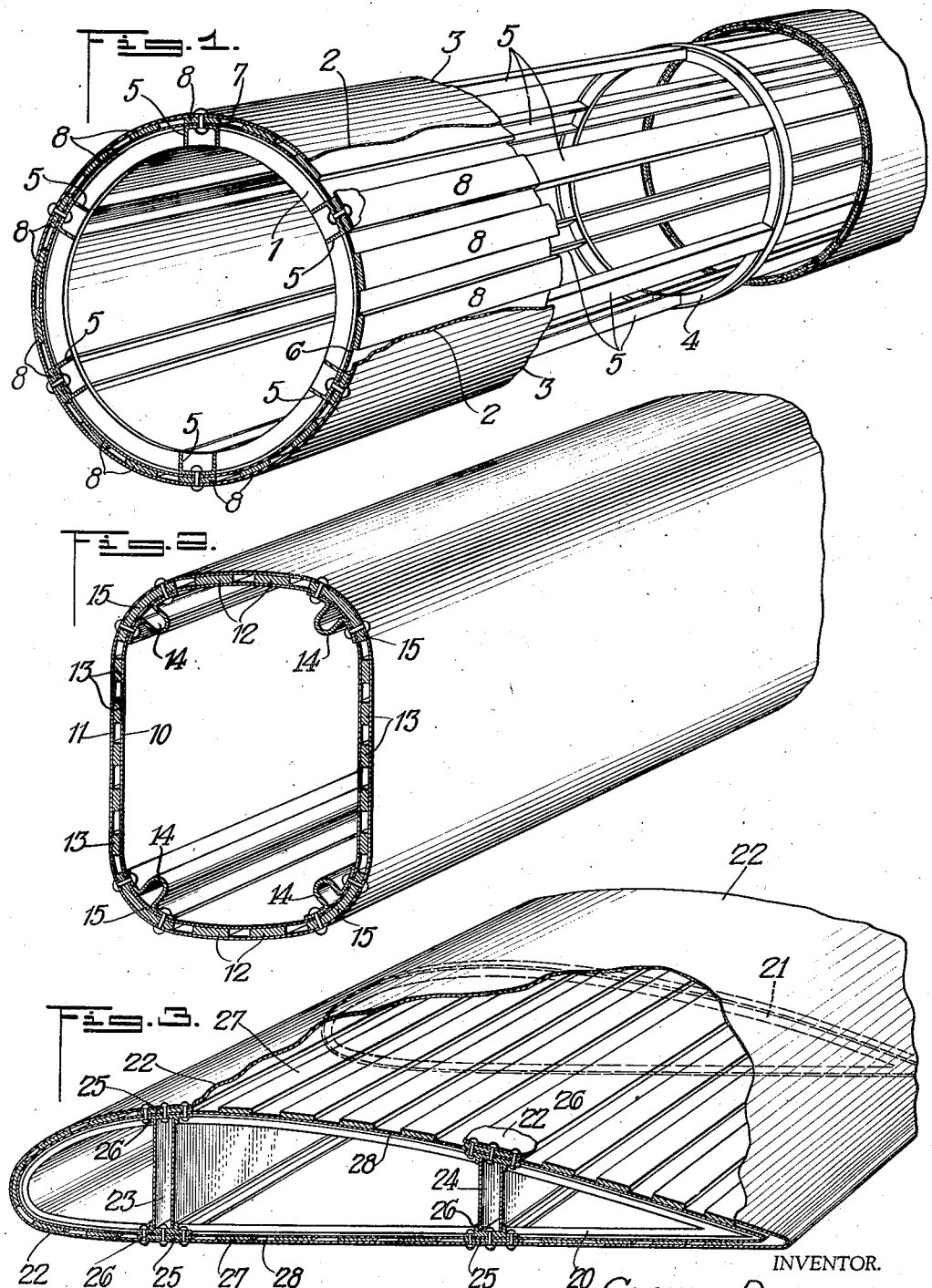

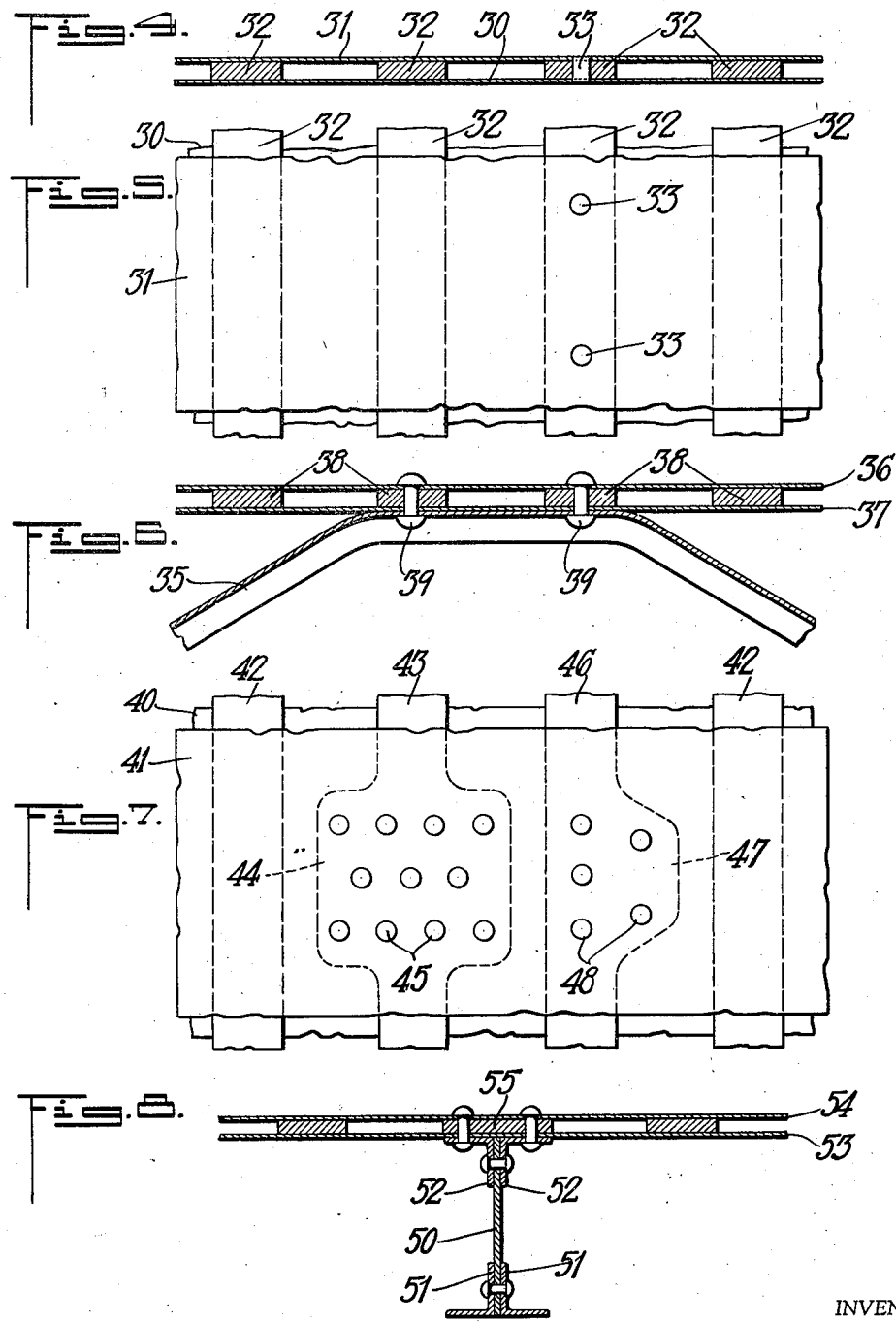

Patented Feb. 9, 1943

2,310,765

UNITED STATES PATENT OFFICE 2,310,765

AIRCRAFT STRUCTURE

Claude Dornier, Friedrichshafen-on-the-Bodensee, Germany; vested in the Alien Property Custodian Application November 4, 1938, Serial No. 238,749
In Germany December 11, 1937

4 Claims. (Cl. 244—117)

The present invention relates to light constructional elements particularly suitable for aircraft and has for its object the provision of elements of the type set forth and which are hollow and have great bending strength and may be used for building wings, rudders, fuselages, boats and other parts of aircraft for which stiff and light construction materials are desired.

An object of the present invention resides in the provision of hollow constructional elements which may be easily manufactured and which may firmly and easily be connected with other structural elements, for example profiled bars, framework, etc. The elements according to the present invention are particularly suitable for making walls, skin or hull of aircraft parts.

The elements according to the present invention include surface skin members with pressure resisting comparatively flat members between, which latter need not be made of metal. Said flat members are solid and of strip like configuration, are preferably at least twice as thick as one of said surface members and are disposed between said surface members in the direction of the main stresses to which the constructional elements are exposed.

The elements according to the present invention may form hollow bodies whereby said flat members may be equidistantly distributed over the circumference of said hollow body and may have equal width throughout their longitudinal extension. Since the bending stresses are usually not the same all around the surface of the hollow bodies it is advisable to vary the distance from one another and the width of the individual longitudinal members in accordance with the stresses they have to sustain. For example, when constructing the fuselage as a hollow body according to the present invention whereby said body has approximately rectangular cross sectional configuration, the longitudinal elements will be made broader and/or of smaller distance from one another at the top and bottom side of the fuselage which sides are usually subjected to greater stresses than the vertical side walls; at the latter the longitudinal members are made smaller and/or are arranged at greater distance from one another. The longitudinal flat members which hold the distance between the two skin like surface members according to the present invention may be made of variable width, for example conical at parts of the structure where the stresses are changing so that in the zones of great stresses the longitudinal members have great width and small distance from one another and in zones of small stresses the members are narrow and have great distance from one another.

At points where other structural elements are connected to the body built according to the present invention, for example where there are longitudinal stringers, the longitudinal flat distance members may be made particularly wide or one very broad piece may be arranged instead of a plurality of small ones.

Because, according to the present invention, the interior strips between the surface skin members are of flat configuration other structural elements such as profiled rods, ribs, frames and the like may be conveniently and strongly connected to the hull or whatever part is built according to the present invention. Connecting parts such as bolts, rivets, etc., are disposed wherever the skin and interior distance members together form a solid body. At such points it is easily possible to drill a hole through skin and distance members and apply a bolt or rivet. If there is an accumulation of holes for rivets and/or bolts, for example, where in the interior of the hollow body several stays or a stay and a rib must be connected, it is advisable to broaden out one or several of the interior strips or laminae which form the distance members at that point between the exterior skin plates to form a gusset-plate.

Where in the interior of a hollow body which is built according to the present invention longitudinal profiles or beams are provided extending in the direction of the main stresses, i. e., also in the direction of the longitudinal interior distance members the flange of said profiles or beams which is adjacent to the exterior skin or the hull of said hollow body may be made up of a lamina which is situated as distance member in between the skin members forming said skin or hull. The stress carrying cross section of said flange then consists of the cross section of said lamina or distance piece between said skin members and the cross section of the strips of said skin members adjacent to said lamina.

Further and other objects of the present invention will be hereinafter set forth in the accompanying specification and shown in the drawings which, by way of illustration, show what I now consider to be a preferred embodiment of my invention.

In the drawings:

Figure 1 is an isometric diagrammatic part sectional illustration of an aircraft body built according to the present invention.

Figure 2 is an isometric diagrammatic part sectional illustration of an aircraft body built according to the present invention having rectangular cross sectional configuration.

Figure 3 is an isometric diagrammatic part sectional illustration of an aircraft wing built according to the present invention.

Figure 4 is a large scale cross sectional view of part of a skin or hull built according to the present invention.

Figure 5 is a top view of the part shown in Fig. 4.

Figure 6 is a large scale cross sectional view of a part of a skin or hull built according to the present invention with a profile element connected thereto.

Figure 7 is a top view of part of a skin or hull built according to the present invention which part is provided with gusset like elements for accommodating an accumulation of rivets or bolts.

Figure 8 is a large scale cross sectional view of part of a skin or hull built according to the present invention to which part a girder is connected.

Figure 9 is a top view of a part of a structural member, the design of which incorporates a modification of the present invention.

Figure 10 is a sectional view of a part of a structural member, the design of which incorporates a modification of the present invention.

Figure 11 is a top view of a part of a structural member, the design of which incorporates another modification of the present invention.

Figure 1 is a perspective showing of an airplane fuselage according to the present invention. The fuselage is cut just ahead of a frame 1. The exterior skin member is cut away at the section lines 2 and 3. The interior skin member is completely removed at the medium part of Figure 1 so that the construction of the supporting framework is visible. At the right end of Fig. 1 both, the interior and the outer skin are shown. The fuselage for an aircraft body has a plurality of frames of which frame 1 and frame 4 is visible in Fig. 1. The frames are interconnected by the longitudinal stringers 5 which have U-shaped cross sectional configuration. The exterior skin or hull is laid around the frames and consists of an interior plate or skin member 6, an exterior plate or skin member 7 and a plurality of distance members 8 which are disposed between plates 6 and 7. The longitudinal stringers 5 are connected with the hull by means of rivets which extend through the web portions thereof and through the hull at such points where there are distance members 8.

Figure 2 is a perspective view of part of an aircraft body or similar hollow body of approximately rectangular cross section. Fig. 2 shows the exterior skin or hull of said body and in the interior corners members 14 which are provided with flange portions and act as longitudinal stringers. The hull consists of interior plate or skin member 10, an exterior plate or skin 11 and distance bodies 12 and 13 between said skins. According to the different stresses the distance members 12 are broader and closer to one another in the lower and upper wall of the body than the distance members 13 in the vertical side walls. In the inner corners of the hollow body profile members 14 are arranged as longitudinal stringers and are so riveted to the skin or hull that the rivets extend through a filled section of the hull. Since the longitudinal stringers serve mainly for transmitting forces to the hull, the distance members 15 which are adjacent to the stringers are particularly broad.

Figure 3 is a perspective view of a part of a wing which is constructed according to the present invention. The wing is cut just in front of a rib 20; another rib 21 is not visible and is shown in dotted lines. The exterior skin 22 is partly broken away. The wing is provided with a front cross beam 23 and a rear cross beam 24. The skin of the wing is composed of an exterior skin plate 22 and an interior plate 28 with ledge or distance members 27 between and extending in the direction of the main stresses. The cross beams 23 and 24 are so riveted to the skin of the wing that the rivets extend through a full cross section, i. e., through the interior plate 28, the exterior plate 22 and the distance member 25 disposed between said plate members. The distance member 25 is of such width that the flange of the cross beams is actually made up not only of the flange member proper 26 but also of the lamina 25 and an adjacent strip of the interior and exterior skin plate. This manner of connecting a cross beam to the skin is shown in larger scale in Fig. 8 which will be described later.

Figures 4 and 5 illustrate in larger scale a skin member constructed according to the present invention. Fig. 4 is a cross sectional view and Fig. 5 is a top view. The skin is composed of a plate 30 and a plate 31 between which plates the strip members 32 which consist of a pressure resisting material are disposed whereby the broad surfaces are in contact with the plate members. 33 designates holes for rivets or bolts. The rivets or bolts thus are positioned in a full cross section, i. e., they extend through both skin plates and the distance member.

Figure 6 illustrates the connection of a girder or other structural element 35 with the skin designed according to the present invention and comprising the plate members 36 and 37 as well as distance members 38. The rivets 39 for connecting the flanges of the structural element 35 to the skin are so positioned that they extend through a distance member 38.

Figure 7 is a top view of part of a skin according to the present invention which covers the part of a body where there is an accumulation of rivets or bolts. The distance members 42 which are disposed between the plates 40 and 41 are of strip like configuration. The distance member 43 is broadened out on both sides at 44 in the manner of a gusset-plate so that a plurality of bolts 45 can be applied. Similarly the distance member 46 is widened out on one side at 47 to accommodate a plurality of holes 48.

Figure 8 illustrates a part of a hollow structural member according to the present invention to which a girder extending in the direction of the main stress, i. e. also in the direction of the distance members within the said structural member is connected. The girder has a web 50 and one flange which is composed of a plurality of angle irons 51 riveted to the web. The flange of the girder which is adjacent to the skin is formed partly by means of the angle irons 52 riveted to the web and also by means of the particularly wide lamina 55 which is disposed between the inner skin plate 53 and the outer skin plate 54 adjacent to the flange of the girder. The total load carrying cross section is therefore the sum of the cross sections of the angle irons 52 plus that of the lamina 55 plus an adjacent strip of the skin plates 53 and 54.

Figure 9 is a top view of a modified construction of a hollow structural member according to the present invention in which between skin plates 56 and 57 distance members 58 are provided which have different widths according to different stresses in the structural member. With the construction shown the stress at the lower end of the member is greater than the stress at the upper end of the member as seen in Fig. 9.

The reduction of stress may also be taken care of in the manner shown in Figure 10 whereby not the width but the thickness of the filling or distance members 63 between the skin plates 59 and 60 is reduced where the stress is less.

Figure 11 is a top view of another modification of the present invention. In this case not only longitudinal parallelly disposed filling members 61 are provided but also other filling members 62 which extend at an angle with respect to the first mentioned filling or distance members 61. The main stresses are in the direction of the filling member 61.

While I believe the above described embodiments of my invention to be preferred embodiments, I wish it to be understood that I do not desire to be limited to the exact details of design and construction shown and described, for obvious modifications will occur to a person skilled in the art.

What I claim as my invention is:

1. A light, sheet like structural element for the construction of the walls of substantially hollow parts of aircraft, said element including two sheet like skin members, and pressure resisting flat strips disposed in the direction of the main stresses to which said structural element is subjected and in between said skin members and fully and closely contacting said skin members with the flat sides, the thickness of said strips being at least twice the thickness of said skin members and being different in accordance with the different stresses to which said structural element is subjected at different parts thereof.

2. A light, sheet like structural element for the construction of the walls of substantially hollow parts of aircraft, said element including two sheet like skin members, and pressure resisting flat strips disposed in the direction of the main stresses to which said structural element is subjected and in between said skin members and fully and closely contacting said skin members with the flat sides, the thickness of said strips being at least twice the thickness of said skin members and the width of said strips being different in accordance with the different stresses to which said structural element is subjected at different parts thereof.

3. A substantially barrel shaped aeroplane fuselage having a skin comprising an outer and an inner sheetlike member and flat, striplike spacer members disposed between said sheetlike members, and channel members having a web portion disposed along said inner sheetlike member and individually parallel to individuals of said spacer members, and connecting members extending through said web portion, adjacent portions of said sheetlike members and individuals of said spacer members therebetween, for rigidly interconnecting said channel members, adjacent portions of said sheetlike members and spacer members between said adjacent portions of said sheetlike members.

4. An aeroplane fuselage having a skin comprising a substantially flat top portion, a substantially flat bottom portion, and substantially flat lateral portions, and corner portions between said substantially flat portions, said skin including an inner and an outer sheetlike member and flat spaced striplike spacer members disposed in substantially parallel relation to one another and between and rigidly connected with said sheetlike members, the striplike spacer members of said top and bottom portions of said skin being broader and closer together than the spacer members of said lateral portions of said skin, the spacer members in said corner portions being broader than the other spacer members, stringer members disposed parallel to the spacer members of said corner portions and adjacent to said inner sheetlike member, and connecting members extending through said stringer members, adjacent portions of said sheetlike members and through individuals of said broad spacer members of said corner portions for rigidly interconnecting said stringer members, adjacent portions of said sheetlike members and spacer members between said adjacent portions of said sheetlike members.

CLAUDE DORNIER.